(12) United States Patent
Edwards

(10) Patent No.: US 7,748,933 B1
(45) Date of Patent: Jul. 6, 2010

(54) FOAM RASP

(76) Inventor: Kerri Edwards, 1432 Lauurene St., Fairbanks, AK (US) 99701

( * ) Notice: Subject to any disclaimer, the term of this patent is extended or adjusted under 35 U.S.C. 154(b) by 6 days.

(21) Appl. No.: 12/069,150

(22) Filed: Feb. 6, 2008

(51) Int. Cl.
B23D 71/00 (2006.01)
B23D 71/02 (2006.01)

(52) U.S. Cl. ..................................... 407/29.1

(58) Field of Classification Search .............. 407/48, 407/40, 53, 103, 33, 34, 64, 29.1–29.15
See application file for complete search history.

(56) References Cited

U.S. PATENT DOCUMENTS

| | | | | |
|---|---|---|---|---|
| 1,753,701 A * | 4/1930 | Grant | ............................. | 76/36 |
| 2,813,329 A * | 11/1957 | Tobey | ..................... | 407/29.12 |
| 2,986,800 A * | 6/1961 | Civitelli et al. | ........... | 407/29.14 |
| 3,008,217 A * | 11/1961 | Hall | ........................ | 407/29.11 |
| 3,086,277 A * | 4/1963 | Hardy | ..................... | 407/29.13 |
| 3,468,079 A * | 9/1969 | Kaufman | ..................... | 451/510 |
| 3,710,467 A * | 1/1973 | Coon et al. | .............. | 407/29.11 |
| 4,941,245 A * | 7/1990 | Yamashita et al. | ....... | 407/29.13 |

* cited by examiner

*Primary Examiner*—Will Fridie, Jr.
(74) *Attorney, Agent, or Firm*—Michael J. Tavella

(57) ABSTRACT

A rasp that has a mounting plate with a number of debris vent ports formed in it. The debris vent ports are formed to allow dust and debris to escape, thereby eliminating a hydroplaning effect on the abrasive surfaces while using the rasp, as well as making the tool lighter. A number of sharp pointed screws are screwed into the plate so that the points extend below the base of the plate. The screw tips become the abrasive rasping surface. The screws can be turned in or out to raise or lower the tips, to change the amount of rasping action from fine to aggressive. The screws can also be easily removed when they become worn so that the abrasive surface is always uniform and fresh. Finally, unlike the other tools, the screws can be removed to clean the base of the plate thoroughly to remove dried or caked mud.

4 Claims, 12 Drawing Sheets

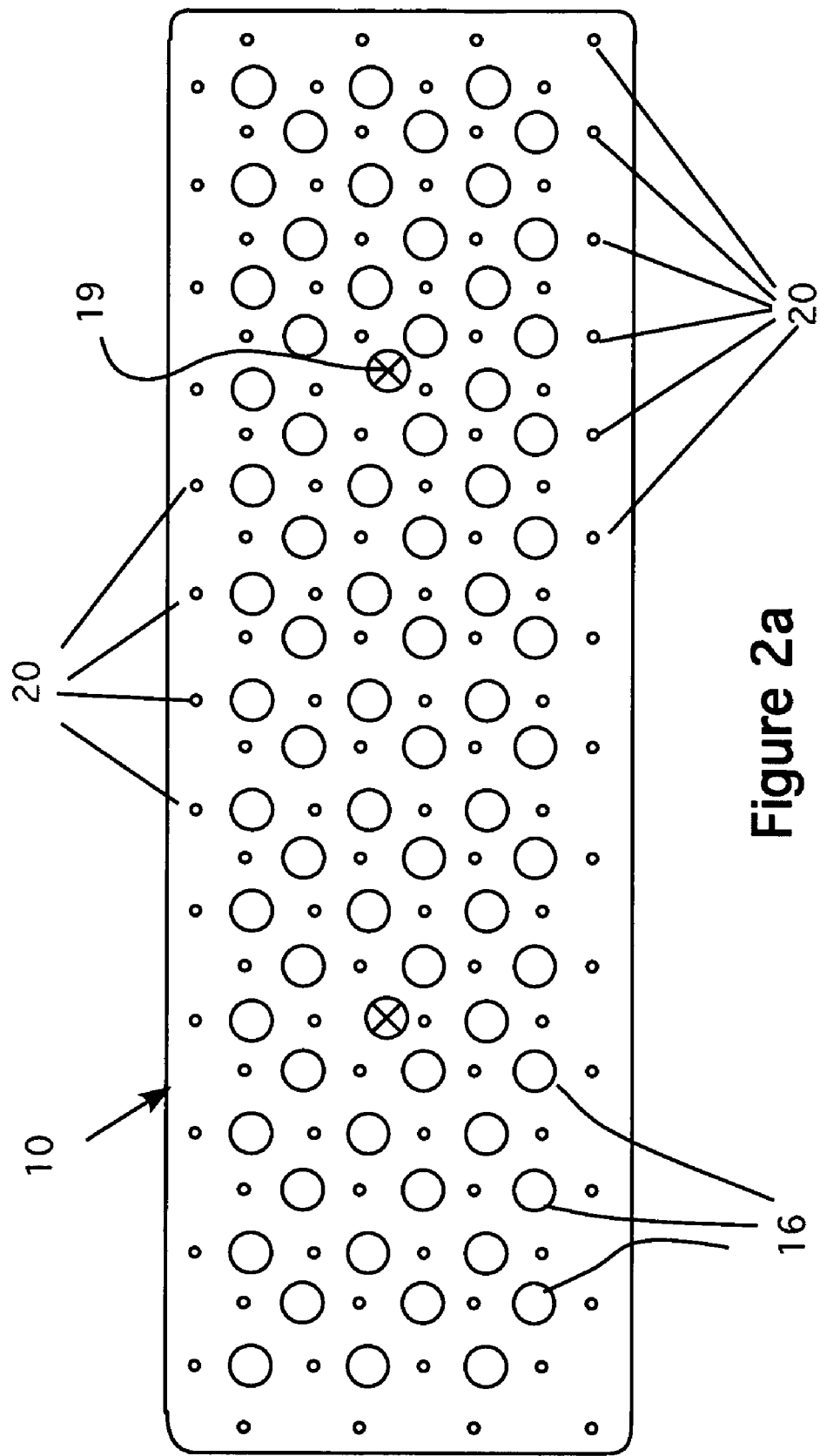

FOAM RASP

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to expanded polystyrene and particularly to expanded polystyrene rasps having replaceable rasp elements.

2. Description of the Prior Art

Expanded polystyrene (EPS) sheets are commonly used in the field of wall surfacing. These products are usually sold in large sheets (typically 2'×4'), which are affixed to building sheathing. The sheets have seams between them that are usually uneven. In addition, the surfaces are normally covered in a thin plaster coating commonly called "mud". This EPS foam is typically sanded to produce a smooth finish for base coating. Many products exist for sanding and preparing the EPS foam boards. These are typically sanding blocks that have abrasive grit papers that are attached. Other tools are rasps that have larger abrasive pieces attached that are more aggressive than sandpapers.

The problems that all these devices suffer from are common; sandpaper quickly dulls and wears out, which requires frequent changing of the paper. Standard rasps are likely to get clogged and worn down over time, which again, requires their replacement. Finally, both the sandpaper and rasps can become contaminated with mud that has not fully hardened. In the case of sandpaper, this simply requires replacing the sheet. In the case of rasps, this requires prompt washing of the rasp to remove the mud. Otherwise, if the mud hardens, it is almost impossible to remove it and not damage the rasp's abrasive surface. Once mud has hardened, the rasp becomes almost unusable.

Another problem with sandpapers and rasps is that foam particles build up underneath the rap. This reduces the effectiveness of the tool because it starts to "hydroplane". This is caused by loose foam balls that cause the rasp to slip or slide across the surface, which reduces the rasp's ability to cut through the foam to smooth it.

Finally, the prior art rasps have grit that is closely clustered together. His close spacing produces a lot of friction that makes it difficult to move the rasp across the EPS foam surface. Thus, these tools require the user to expend more energy to make the tool work.

BRIEF DESCRIPTION OF THE INVENTION

The instant invention overcomes these problems. It is a rasp that has a mounting plate with a number of debris vent ports formed in it. One set of debris vent ports is formed to allow dust and debris to escape, thereby eliminating the hydroplaning effect on the abrasive surfaces while using the rasp, as well as making the tool lighter. The second set of holes holds a number of sharp pointed screws. These screws are screwed into the plate so that the points extend below the base of the plate. In this way, the screw tips become the abrasive rasping surface. The screws can be turned in or out to raise or lower the tips, to change the amount of rasping action from fine to aggressive. The screws can also be easily removed when they become worn so that the abrasive surface is always uniform and fresh. Moreover, the screws are spaces uniformly apart, sufficiently so to significantly reduce friction during use. This makes using the rasp easier and prevents the user from exerting more energy than necessary to perform the work. This efficient spacing, combined with the elimination of the hydroplaning effect, produce a tool that operates at maximum worker efficiency and effectiveness.

Finally, unlike the other tools, the screws can be removed to allow the base of the plate to be thoroughly cleaned to remove mud. Even if the mud has dried, the tool base can be scraped with a blade to completely clean it without harming the abrasive qualities of the rasp. When clean, the screws are replaced and the rasp is ready again for use. In one embodiment, a handle is attached to the rasp so that it can be used as a hand sander. In another embodiment, my previous sanding device, the subject of U.S. Pat. No. 5,762,545, is modified to replace the sanding pads with rasps.

BRIEF DESCRIPTION OF THE DRAWINGS

FIG. 2a is a bottom view of my new hand rasp with the screws removed.

DETAILED DESCRIPTION OF THE INVENTION

Figure 1:
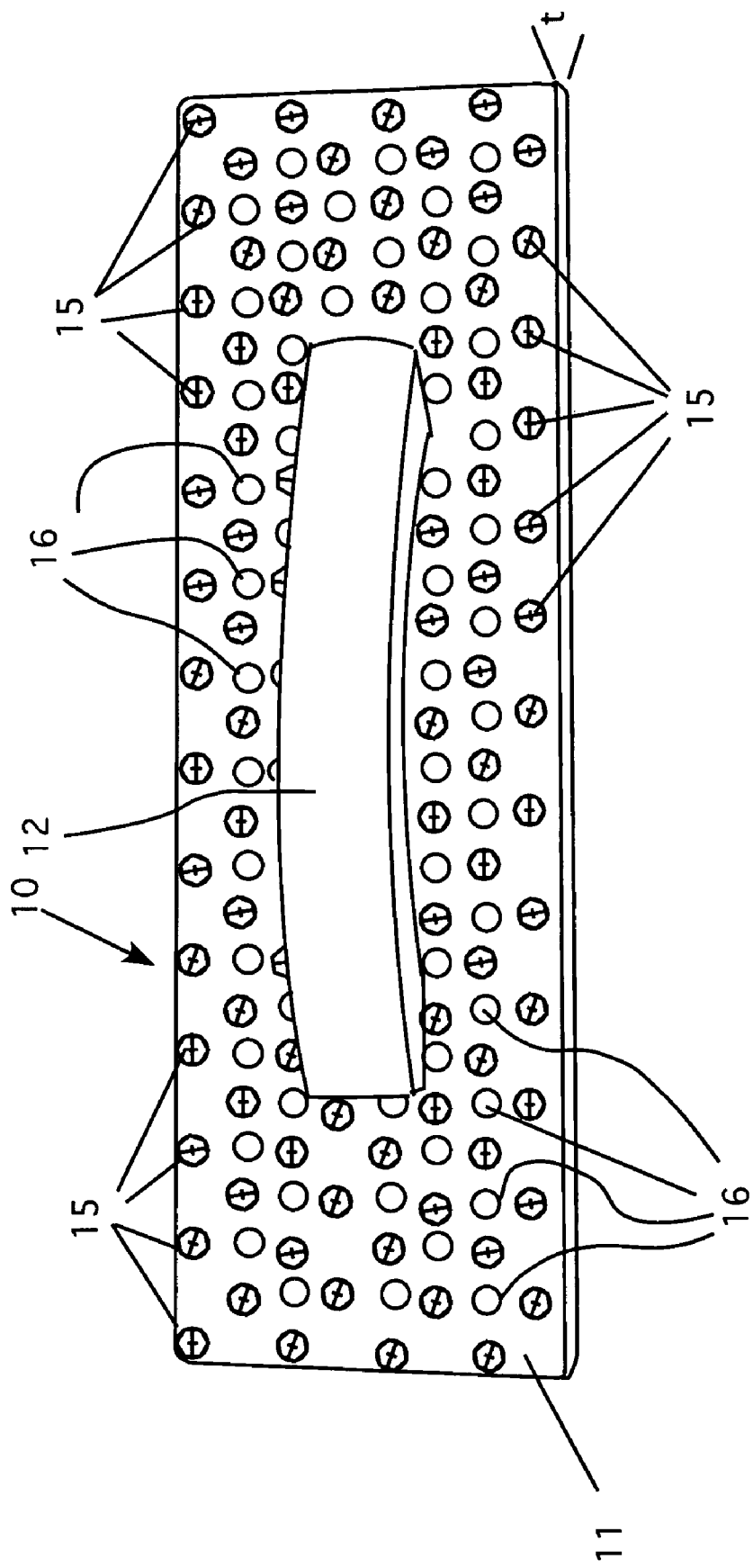
FIG. 1 is a top perspective view of my new hand rasp.

Referring now to FIG. 1, a top perspective view of my new hand rasp 10 is shown. Although it is shown with a generally rectangular form, which is preferred, it can be made to any desired shape. Moreover, it can be made to any length. In one model, the rasp is four feet long and is rectangular. However, that is a matter of design choice. The mounting plate 11 has a thickness t to accommodate the length of a number of screws, which act as abrasive elements. The thickness t must be large enough to ensure that the screws have a good purchase in the plate, but not so large as to overly restrict the length of the screw tips, as discussed below. A handle 12 is shown attached to the mounting plate. The shape of the handle can be varied, but ideally, the preferred handle shape has an ergonomic design that allows for comfortable use of the tool for extended periods. The screws 15 are positioned throughout the surface of the plate in a uniform pattern. Note that in the preferred embodiment, the screws 15 have hex heads on them. This allows the use of a nut driver or socket to be used to remove and install them, making replacement and adjustments faster and easier. Interspersed among the screws, also in a specific pattern are a number of holes, or debris vent ports 16. These ports are designed to allow dust and other particles to escape from the bottom surface of the rasp. This prevents buildup of dust and debris under the tool, which reduces its effectiveness and requires frequent stops to clean the tool. The debris vent ports also make the tool lighter, which can help when having to use the tool for long periods.

Figure 2:
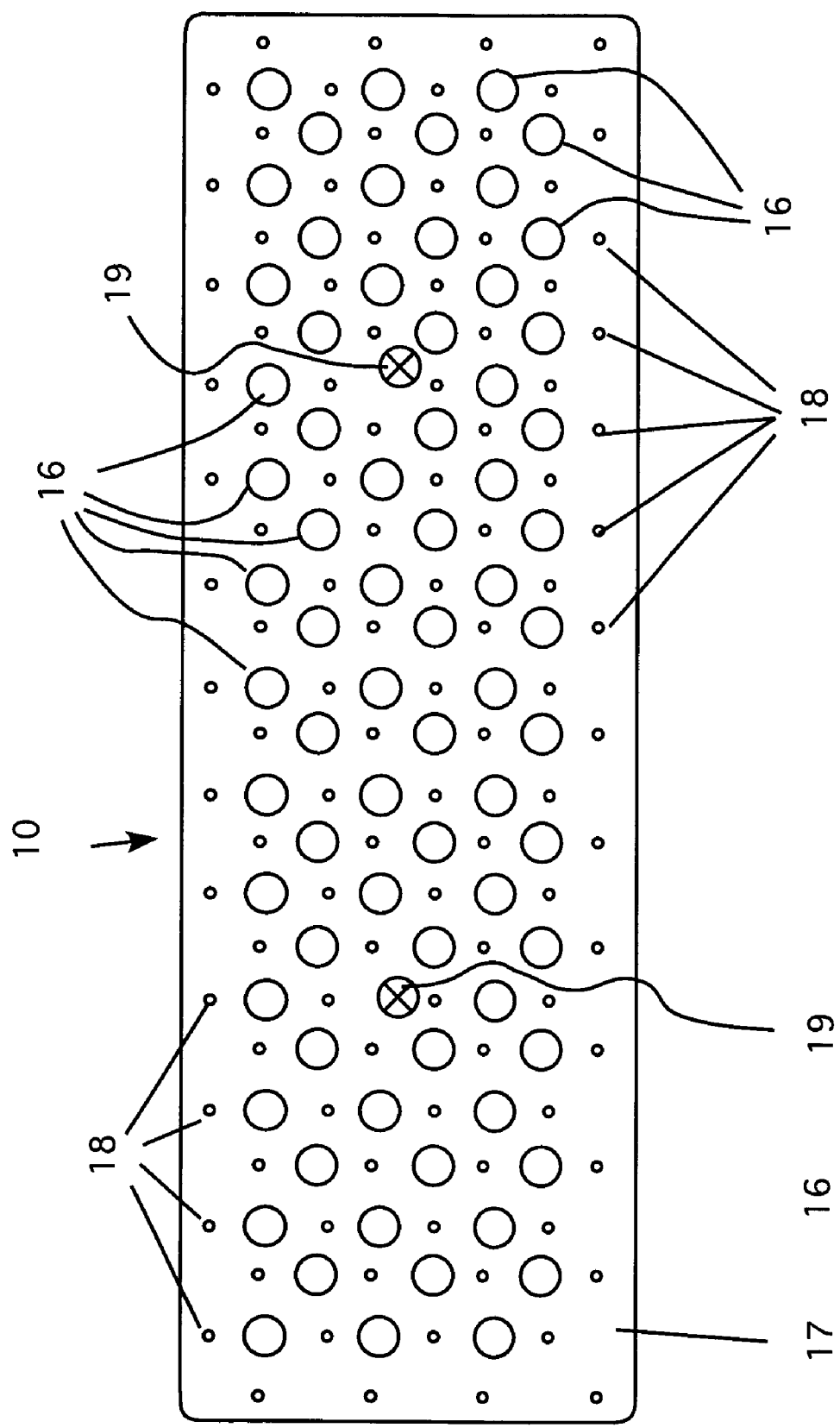
FIG. 2 is a bottom view of my new hand rasp with the screws installed.

FIG. 2 is a bottom view of my new hand rasp. Here, the bottom surface 17 of the mounting plate 11 is shown. The tips 18 of the screws 15 are also shown protruding from the mounting plate. The debris vent ports 16 are also shown in the view. Note also that the screws 19 that attach the handle to the plate are also shown.

FIG. 2a is a bottom view of my new hand rasp with the screws removed. Although this view looks similar to that of FIG. 2, in this view, the screws are removed. The small holes 20 are actually the holes into which the screws are placed. In this view, the bottom of the mounting plate is flat and smooth. In this mode, the bottom of the plate can be cleaned thoroughly without damage to the abrasive materials.

Figure 2B:
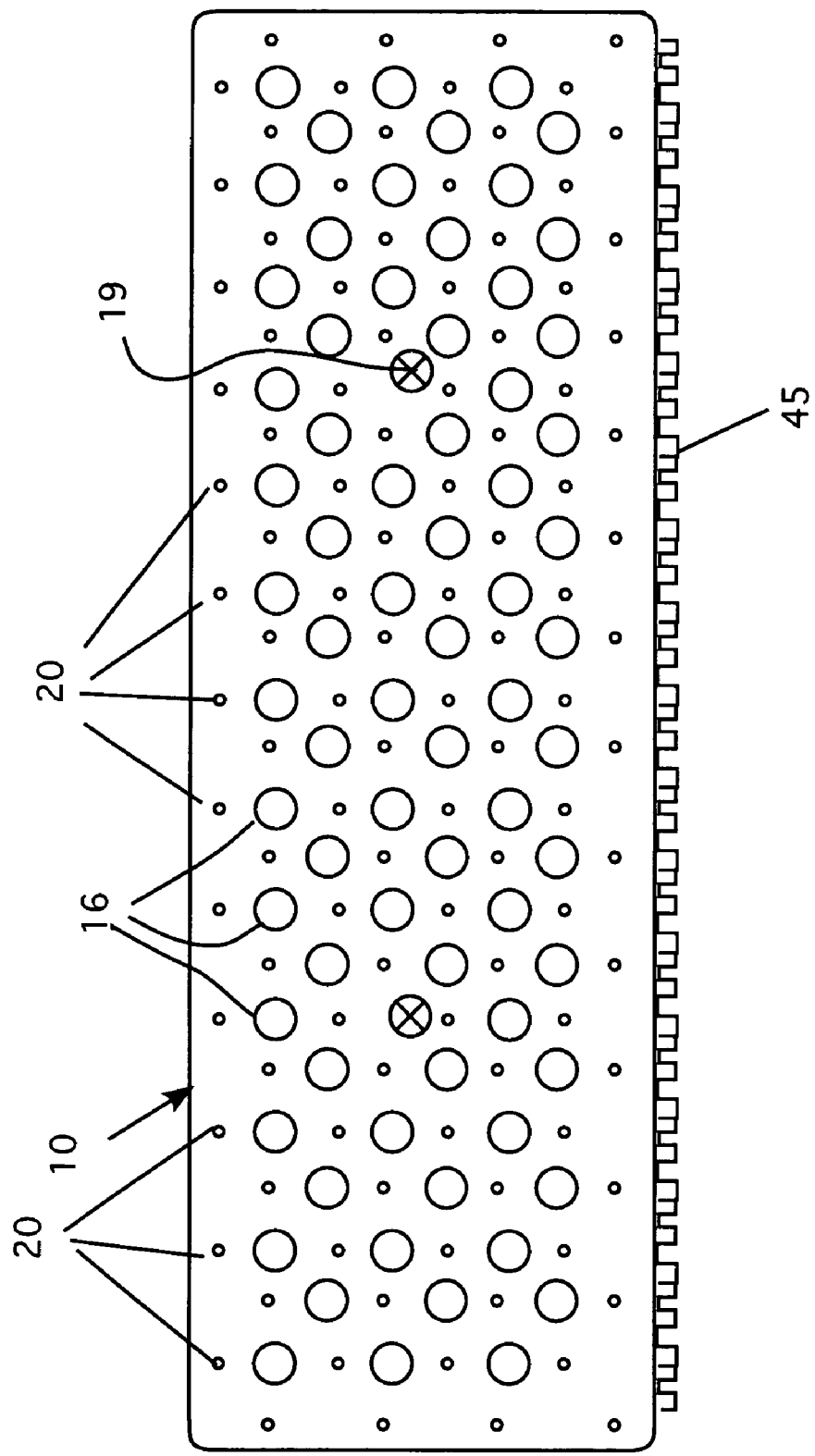
FIG. 2b is a bottom view of my new hand rasp showing an optional edge blade installed.

FIG. 2b is a bottom view of my new hand rasp showing an optional edge blade 45 installed. Here, the edge blade has a saw tooth edge and is used for aggressive rasping of the foam. This is used to shave high spots as well as being used as a cut-off saw. Note that this type of edge can be used on any of the embodiments disclosed herein. Note also, that this embodiment shows the debris vent ports as being square. Note that the ports can be any desired shape, although the round are preferred.

Figure 3:
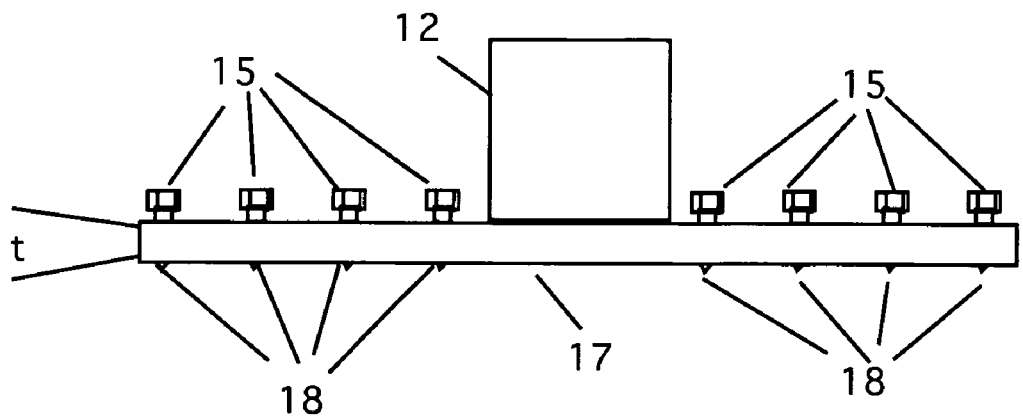
FIG. 3 is an end view of the rasp showing the screws set for mild abrasion.

FIG. 3 is an end view of the rasp showing the screws set for mild abrasion. In this view, the screws 15 are shown turned out of the holes 18. This raises the screws in the plate to minimize the size of the tips 18.

Figure 4:
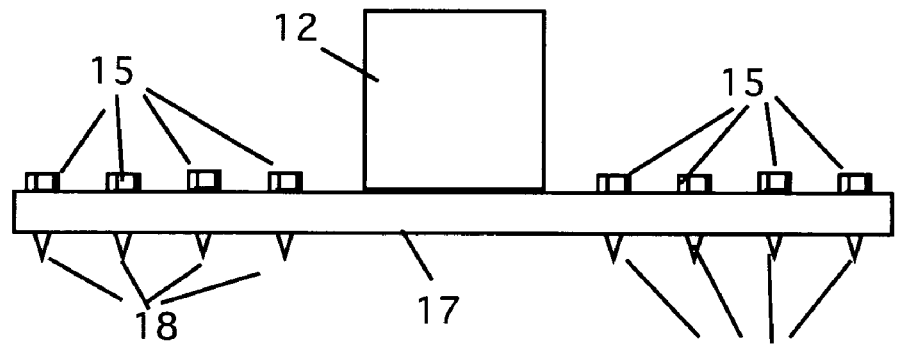
FIG. 4 is an end view of the rasp showing the screws set for aggressive abrasion.

FIG. 4 is an end view of the rasp showing the screws set for aggressive abrasion. Here, the screws are turned fully down into the holes. As shown, the tips 18 protrude the furthest from the holes. This creates an aggressive abrasive surface for rasping. Note that the ability to adjust the height of the screws gives them an abrasive quality that can be adjusted from mild to aggressive by changing their height.

Also note, that the screws can have different heights in an alternating pattern, for example, in which some screws are set deeper and some shallower to produce a mixed level of abrasion. Any desired combination of depth can be achieved by simply adjusting the heights of the screws. Note that some screws can be removed to make the pattern broader, if desired. Thus, the tool gives a user a wide variety of abrasive settings that are simply not available on a fixed abrasive rasp.

Figure 5:
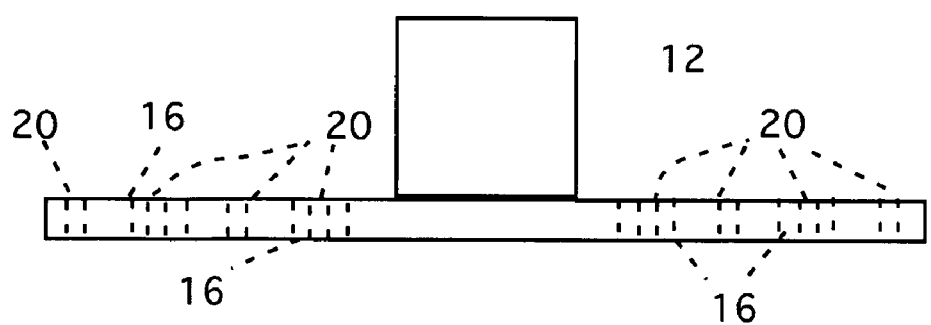
FIG. 5 is an end view of the rasp showing the screws removed.

FIG. 5 is an end view of the rasp showing the screws removed. In this view, the screws are removed. The bottom 17 of the plate is flat and smooth. Note the vent ports 16 and holes 20 are shown.

Figure 6:
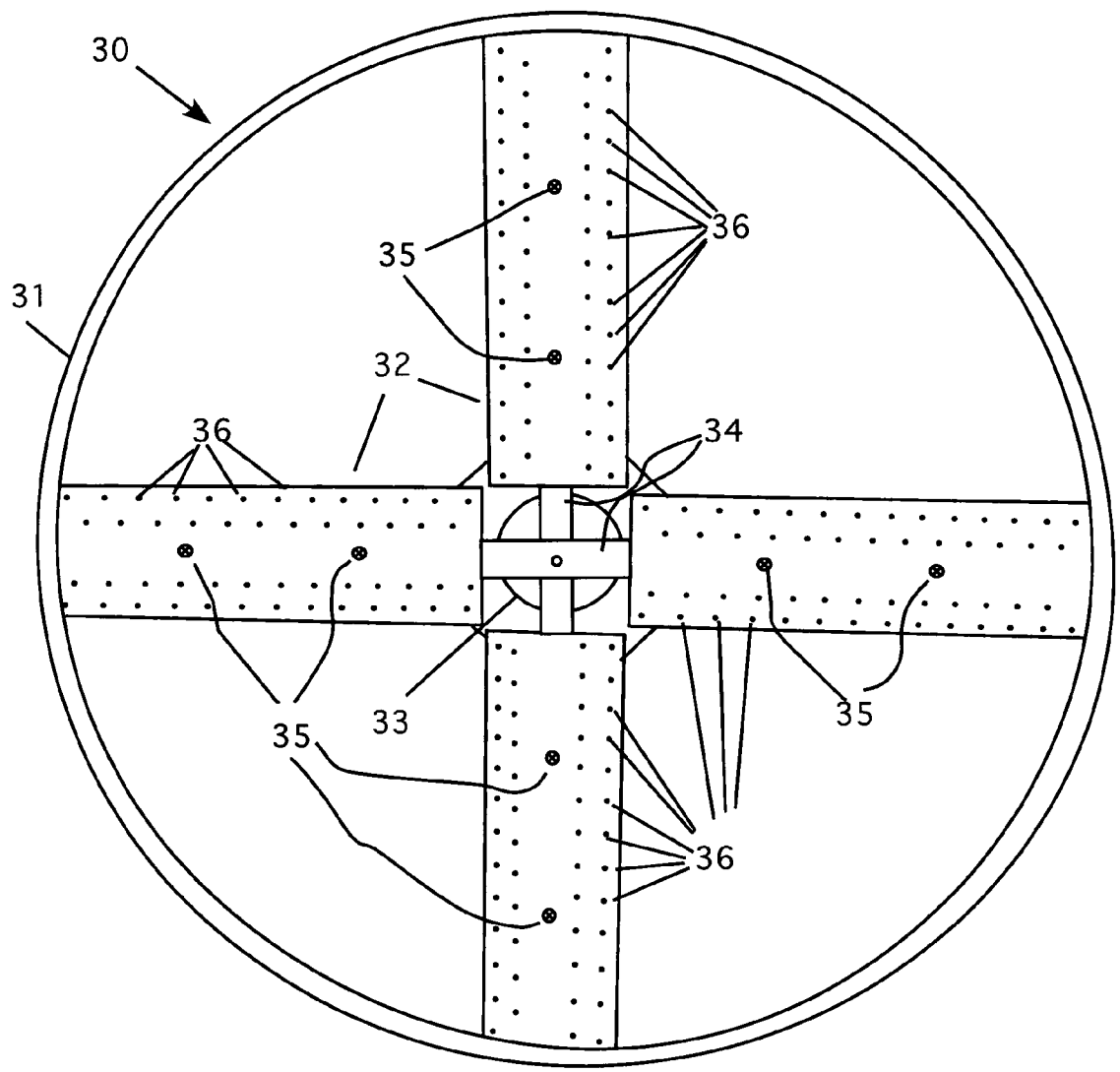
FIG. 6 is a front view of my new rotary rasp.

FIG. 6 is a front view of my new rotary rasp. This device 30 is intended to be mounted in a power tool, such as a ½-inch drill. It is designed to rotate as it works against the surface of the board. It has an outer ring 31 that acts as a safety device for the arms 32 that extend radially from the center hub 33. Two supports 34 (square tubes) extend along the back of the arms to provide additional support. They are secured by screws 34a. As before, numerous screws 35 are used to provide the rasping actions. In this view, the tips 36 of the screws are shown extending through the plates. The operation of the screws is identical to that of the hand rasps discussed above. Note also that in this view, there are no debris vent ports provided in the arms. This is shown because, although they are preferred for proper operation, it is possible to build the device without the vent ports. Such a design is not preferred, even though it can be built.

Figure 7:
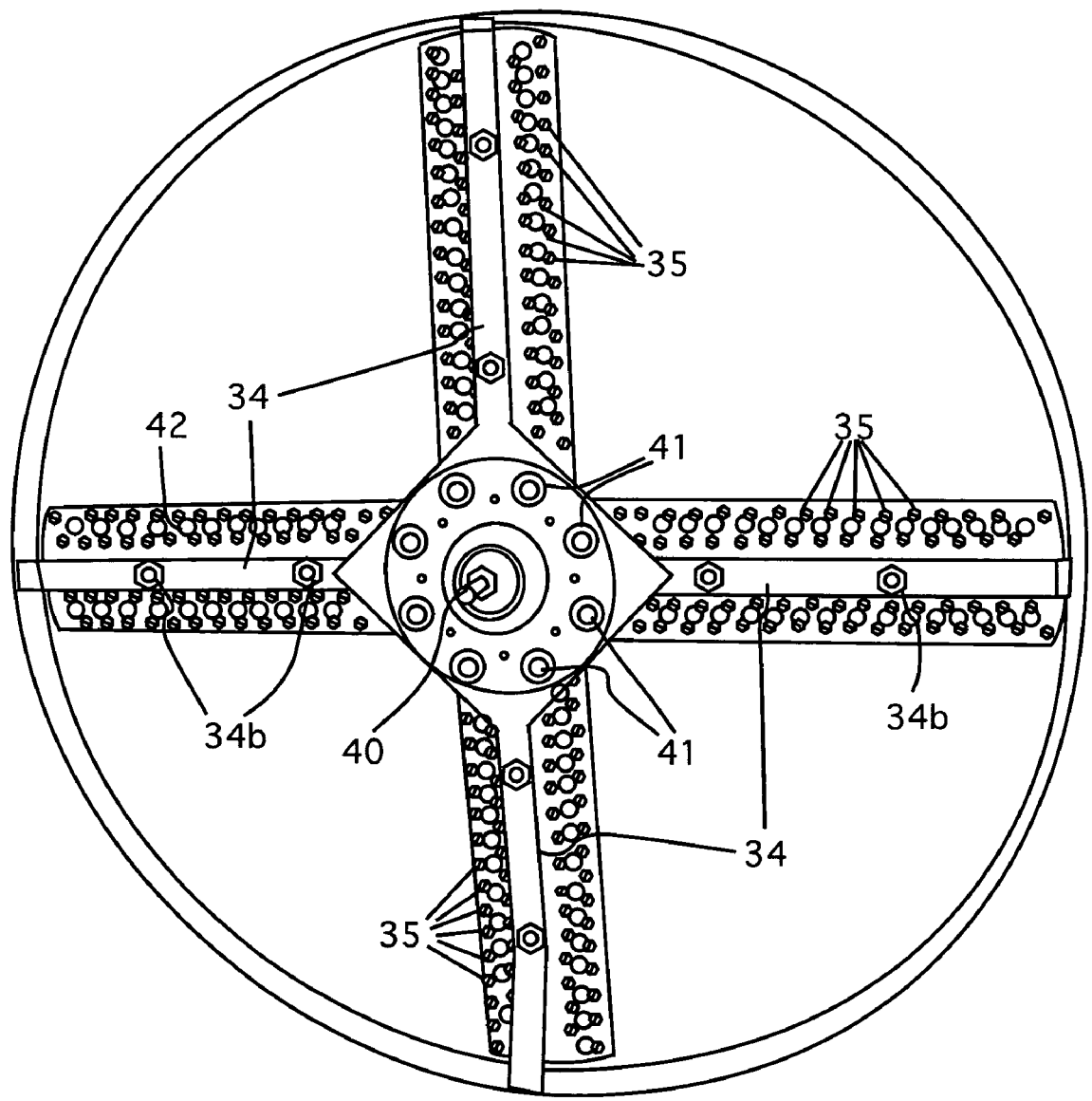
FIG. 7 is a rear view of my new rotary rasp.

FIG. 7 is a rear view of my new rotary rasp. Here, the square tubes 34 are shown with nuts 34b. The tops of the screws 35 are shown. Note also the hub 33 is shown with the tool shaft 40 and securing hardware 41.

Figure 8:
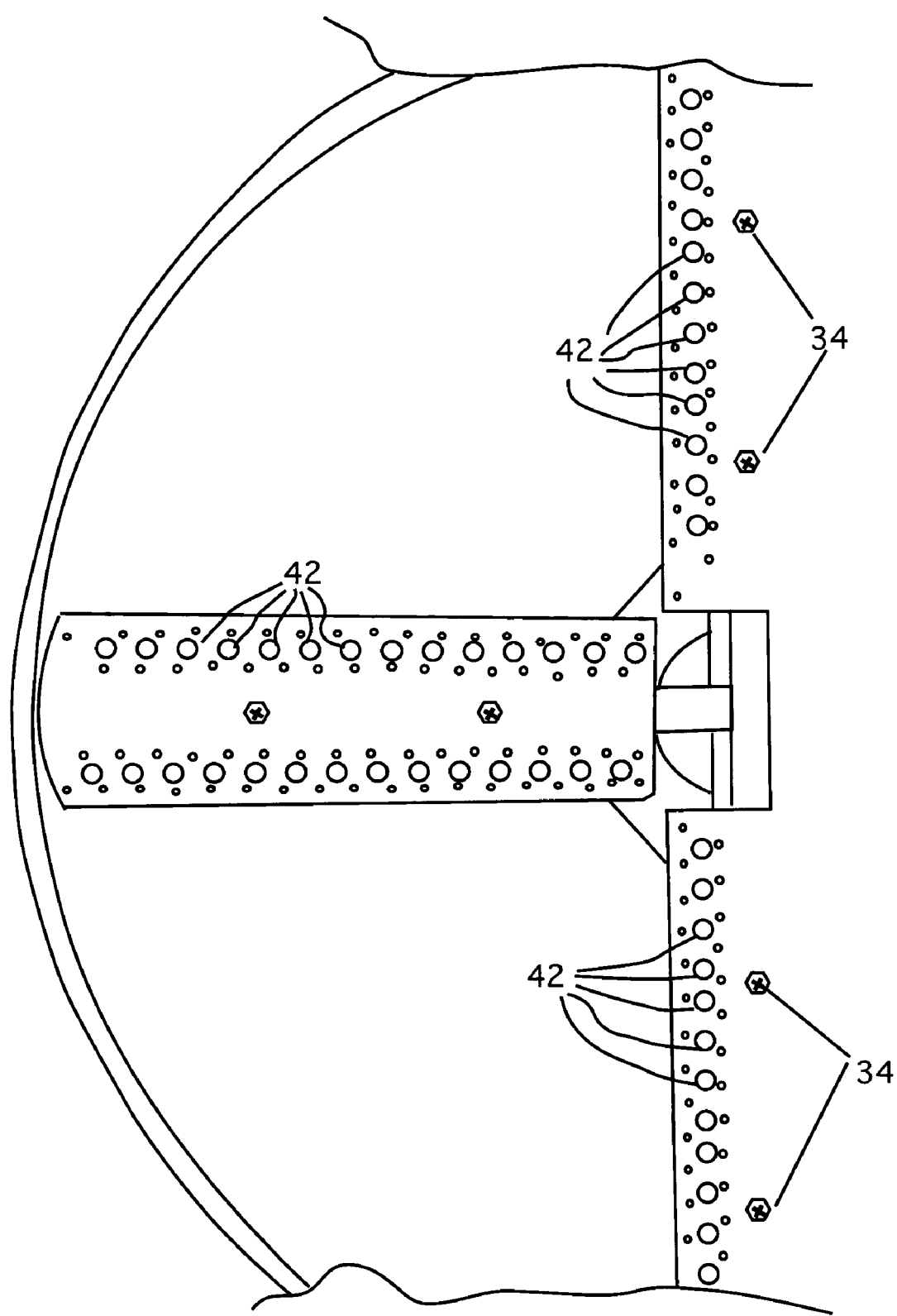
FIG. 8 is a front detail view of my new rotary rasp, showing optional dust debris vent ports.

FIG. 8 is a front detail view of my new rotary rasp. This is a partial view of the front face of the tool showing the dust debris vent ports 42. As noted before, these debris vent ports also help to make the tool lighter, which makes using the tool easier. As before, the screws can be driven in or out as desired for the proper degree of abrasion. They can be removed as necessary to replace worn screws or to clean the blades.

Figure 9:
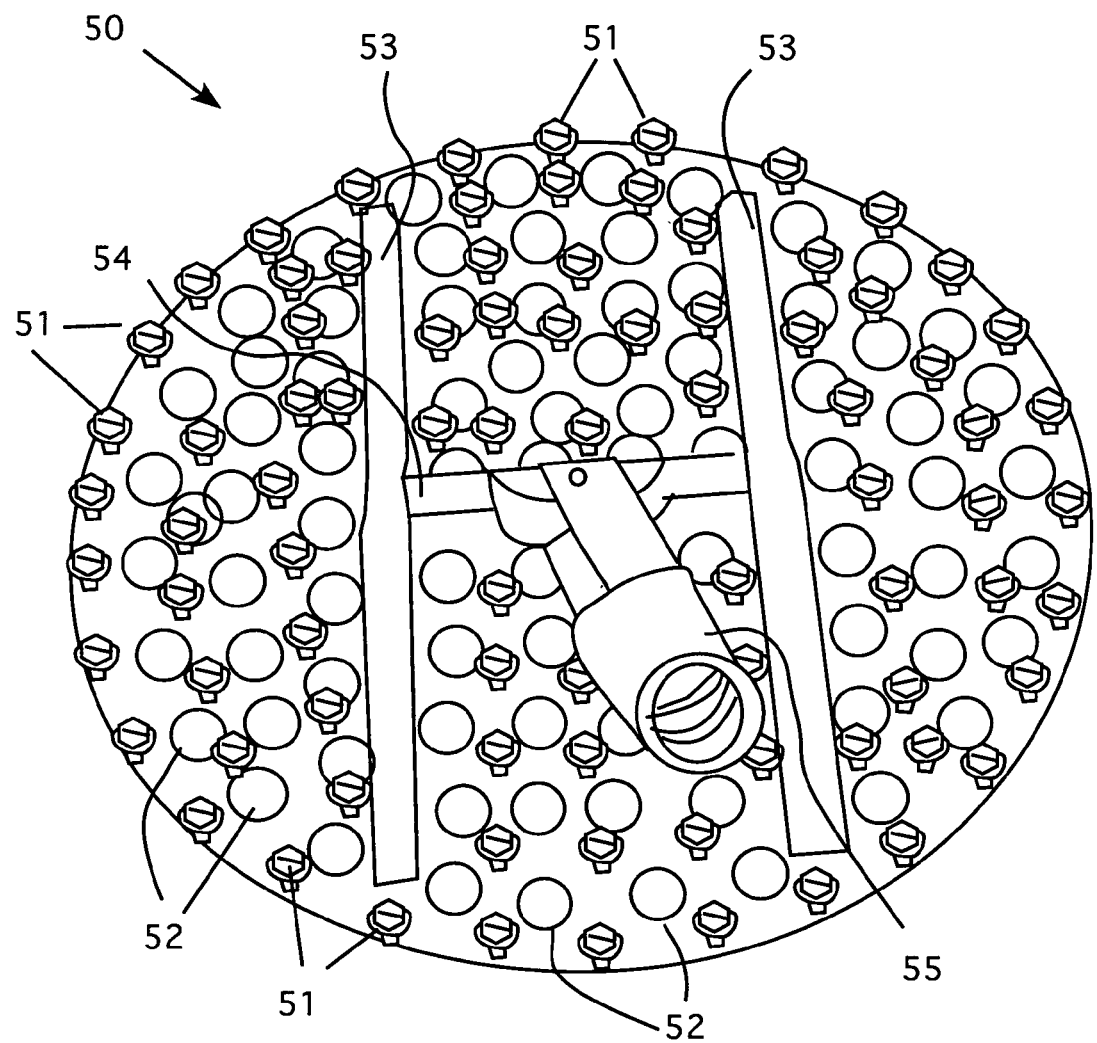
FIG. 9 is a perspective view of a circular disk type rasp with a fixture for a pole mount.

FIG. 9 is a perspective view of a circular disk type rasp 50 with a fixture for a pole mount. In this embodiment, the invention is a small disk about 1 foot in diameter. It has a number of screws 51 set about the flied of the sick as shown. These screws are the same as those use in the other embodiments and are used in the same manner. Also, note that a number of debris vent ports 52 are positioned about the disk as well. As noted above, these debris vent ports are used to release dust from under the rasp as well as making the tool lighter. In the center of the disk is a brace 53 that supports a central rotating bar 54 that has a screw head 55 that is used to attach a pole handle.

Figure 10:
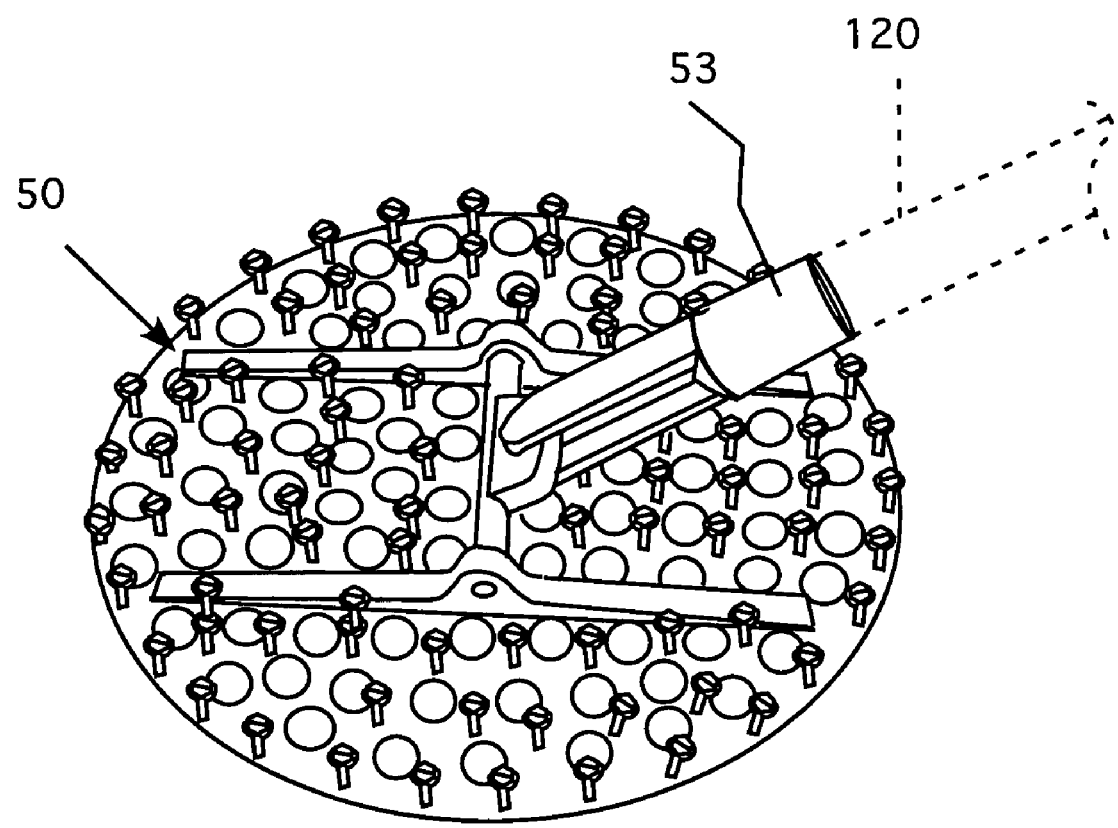
FIG. 10 is a perspective view of the circular disk type rasp with a pole installed in the mount.

FIG. 10 is a side perspective view of the circular disk type rasp with a pole 120 installed in the mount. In this case, the disk can be used to reach inaccessible places by using an extendible pole. Note also that the screws 51 are shown almost fully backed out for the lightest degree of abrasion available.

Figure 11:
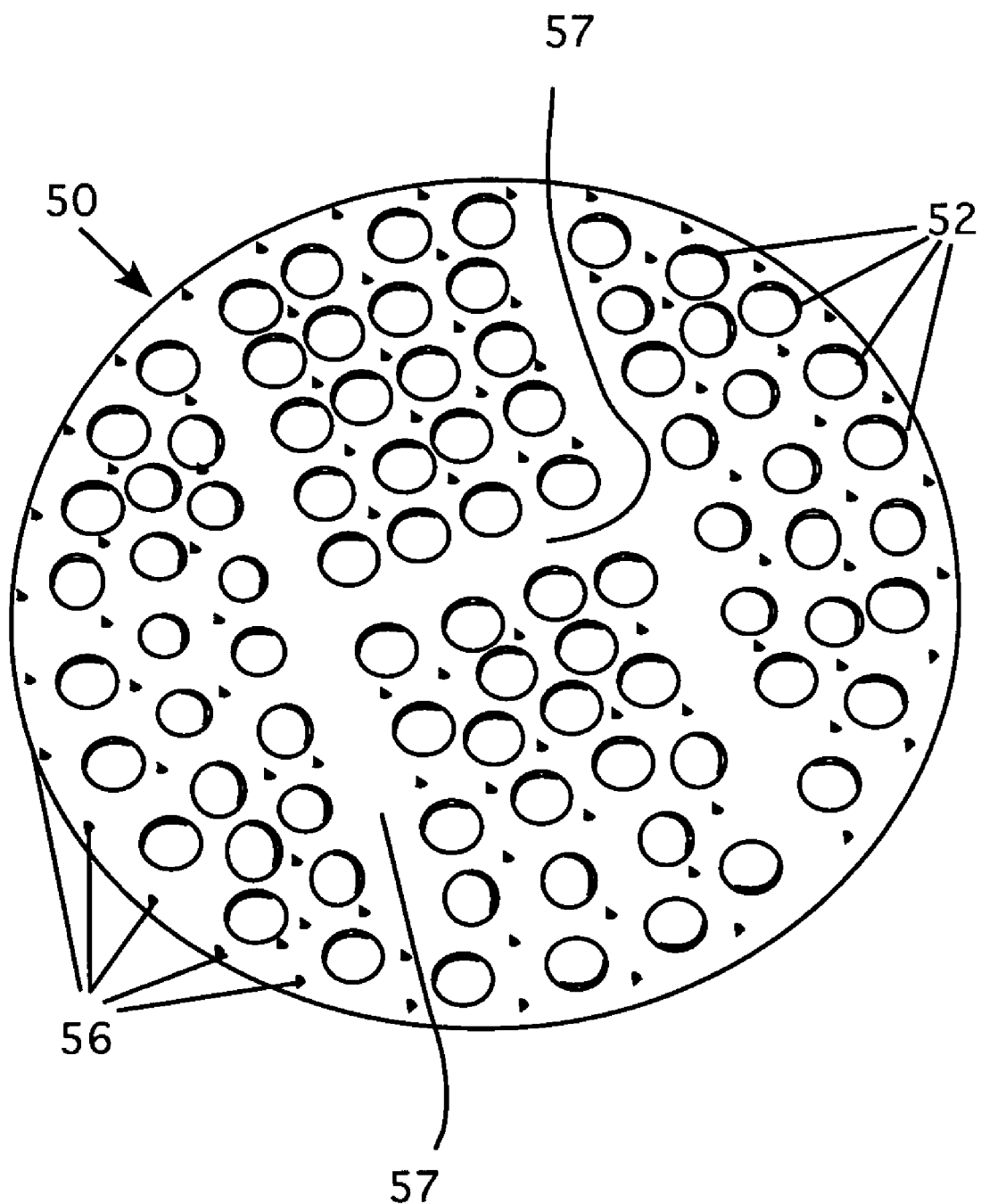
FIG. 11 is a bottom detail view of the circular disk type rasp.

FIG. 11 is a bottom detail view of the circular disk type rasp 50. Here, the tips 56 of the screws are shown protruding from the bottom of the disk. Note also that in this view, the areas occupied on the top by the brace 57 are not filled with debris vent ports or screws. Obviously, if a different mount were to be used, the patter of debris vent ports and screw would be modified to fit the particular pattern of that mount.

Figure 12:
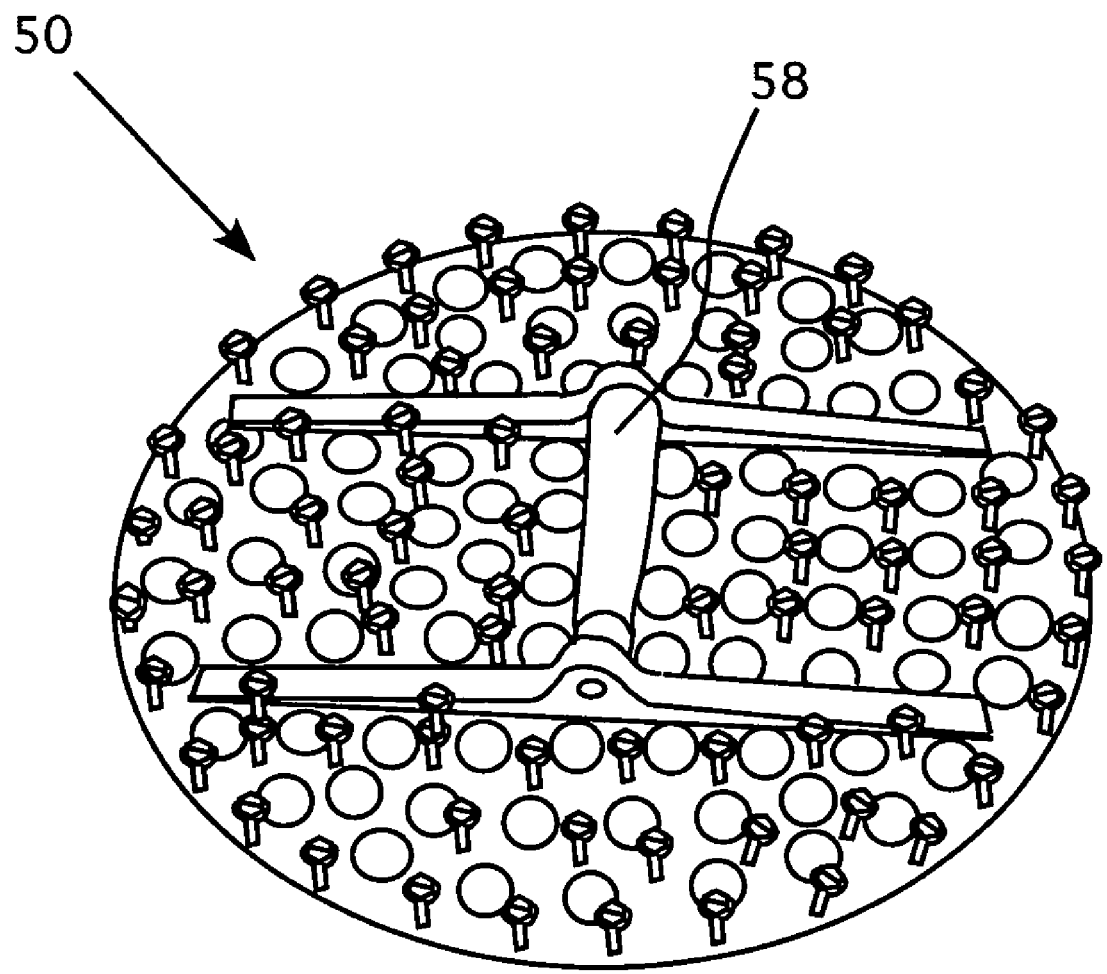
FIG. 12 is a perspective view of the circular disk type rasp with a handle for hand rasping installed on the mount.

FIG. 12 is a perspective view of the circular disk type rasp with a handle for hand rasping installed on the mount. In this vie, the swing handle has been replaced by flat handle 58 to be hand-held for use. Although this style is not preferred, it can be used to work the disk in many areas as well.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A rasp for expanded polystyrene foam boards comprising:
   a) a generally thin, central hub;
   b) a plurality of thin, flat, generally rectangular blades, attached to said central hub and extending radially outward therefrom;
   c) a plurality of screws having an abrasive quality said plurality of screws being apportioned among said plurality of blades in groups, and further wherein, each of said plurality of screws within each group being individually removably installed in said plurality of blades as apportioned; and
   d) a means for turning said hub.

2. The rasp of claim 1 wherein the abrasive quality is adjustable.

3. The rasp of claim 1 wherein each of said plurality of blades further comprises a plurality of debris vent ports formed therein, said plurality of dust debris vent ports being interspersed with plurality of abrasive elements installed in each of said plurality of blades.

4. The rasp of claim 1 wherein each of the plurality of screws has a height and further wherein the abrasive quality of the plurality of screws is related to the height of each of the plurality of screws individually protruding from each of the plurality of blades.

* * * * *